Aug. 3, 1926.
S. W. OBERTO
1,594,684
LOGGING TRUCK
Filed July 14, 1924
2 Sheets-Sheet 1
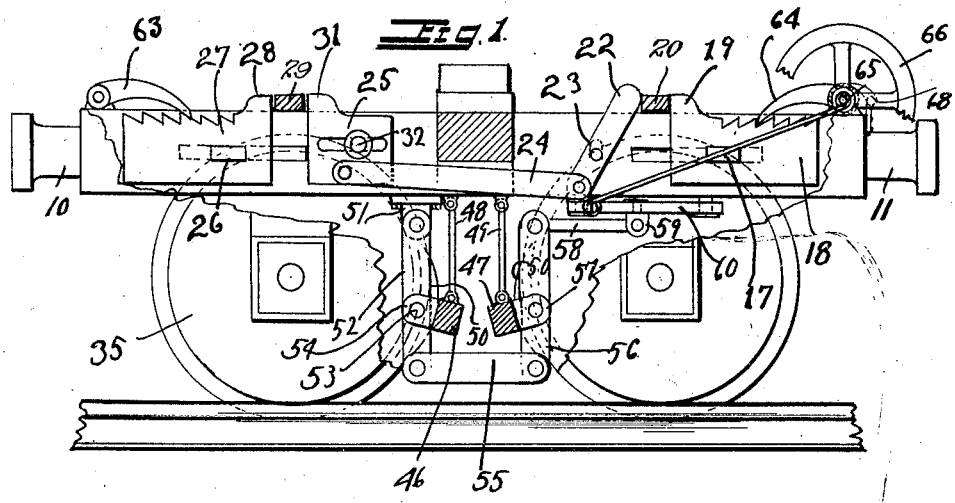
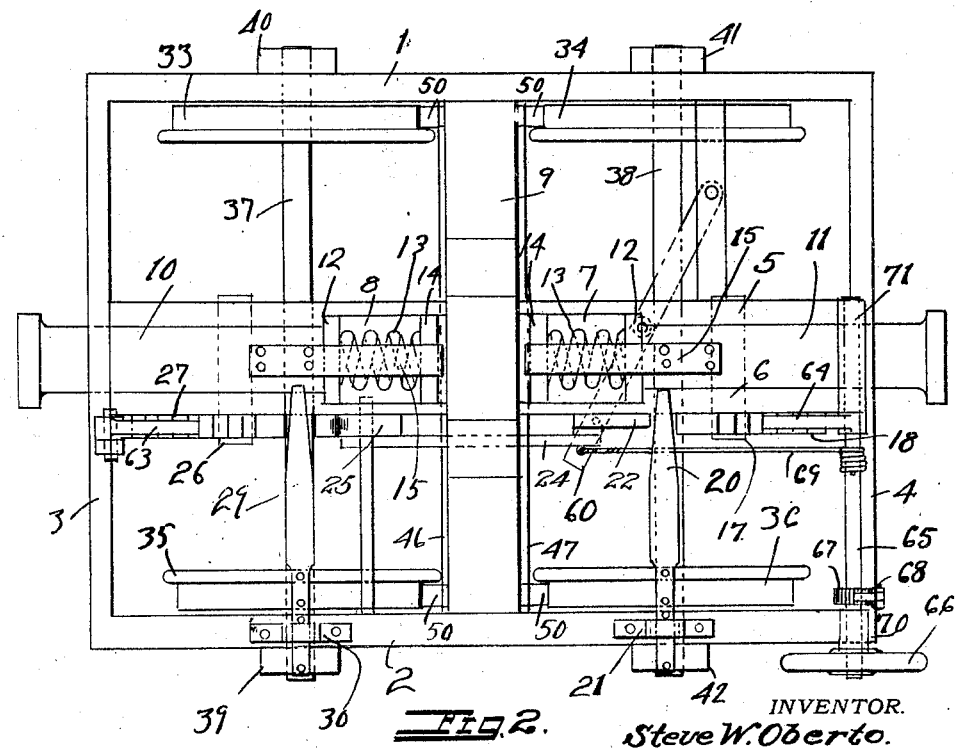
INVENTOR.
Steve W. Oberto.
BY
Carlos P. Griffin
ATTORNEY.

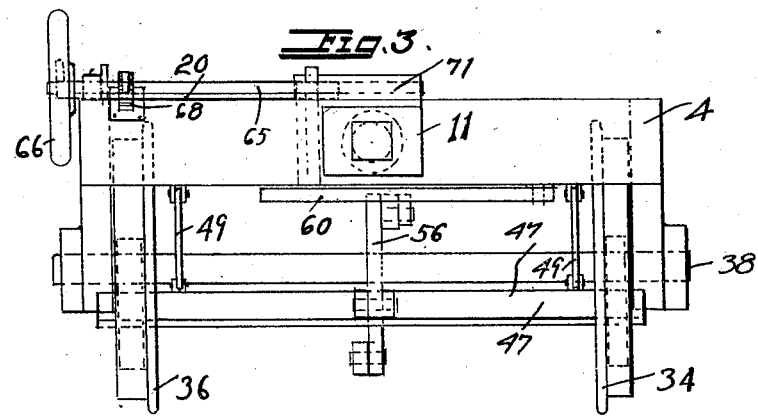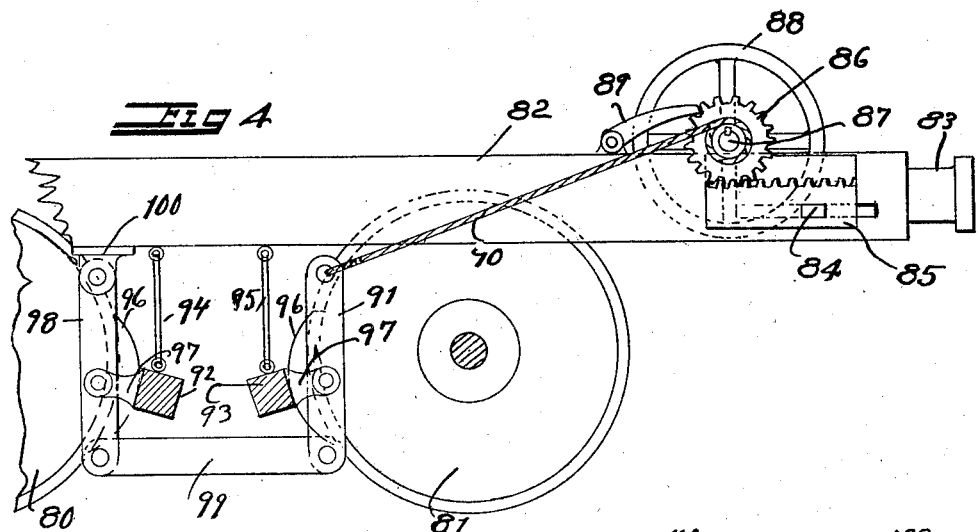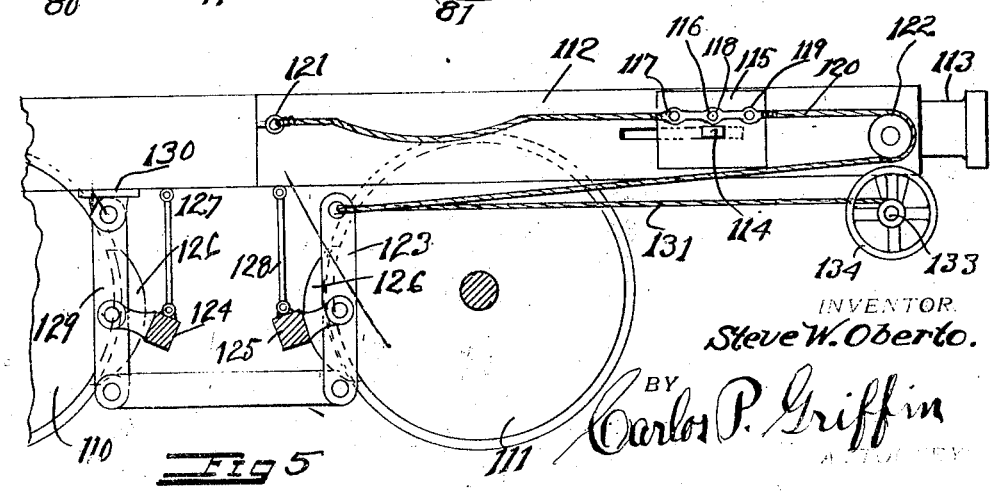

Patented Aug. 3, 1926.

1,594,684

UNITED STATES PATENT OFFICE.

STEVE W. OBERTO, OF SAN FRANCISCO, CALIFORNIA.

LOGGING TRUCK.

Application filed July 14, 1924. Serial No. 725,800.

This invention relates to a logging truck and its object is to provide means whereby the weight of the load itself will operate the truck to prevent the truck from running down hill too rapidly.

Another object of the invention is to provide means whereby the truck brake may be operated from either end.

It will be understood by those skilled in the art that in logging camps, it is common to provide a series of trucks to which the logs are secured, two trucks being required for one log, if it is a large one, or where the logs are small enough in diameter, for a number where a number can be placed upon them. The logs are of considerable length and are secured to the trucks closely adjacent the end of the logs so that when a train of them is ready to be sent away from the logging grounds, the bumper of one truck, carrying one log, will contact with the bumper of another truck, carrying one end of another log or set of logs, while the third truck will be at a considerable distance from the second truck, and will be so arranged that its bumper will contact with the bumper of the truck connected to another set of logs.

In this manner the logs themselves form a part of the structure of a train, and it is difficult to provide means to brake the train which is operated from the engine, as is the case with the ordinary system of air brakes.

It is further necessary to provide means whereby the engine can back-up an entire line of trucks forming a train when they are empty without having the brakes set, means being provided to disengage the brakes from the bumper when the train of trucks is being backed up for a fresh supply.

Another object of the invention is to provide a logging or railroad truck which dispenses with the air brake now in use.

A further object is to provide a brake system operated by the drawhead of the truck, whereby when the brakes are set on the locomotive by the engineer the brakes on all the trucks in the train are set automatically.

In case a stop is made when going upgrade, the brakes on the tail end are set by hand or other means, this action setting all the brakes on all intervening trucks automatically.

Other objects of the invention will appear as description proceeds.

An embodiment of the invention is shown in the accompanying drawings in which the same reference numeral is applied to the same portion throughout, but I am aware that there may be modifications thereof.

Fig. 1 is a side elevation of a truck with a portion of the side frame cut away for purposes of illustration.

Fig. 2 is a plan view of the same truck frame.

Fig. 3 is an end elevation of the truck frame shown in Fig. 1.

Fig. 4 is a side elevation partly in section of a portion of the truck frame illustrating the use of a cable for operating the brakes.

Fig. 5 is a further modified form in which a cable is used for the operation of the brakes, a portion of the truck frame being illustrated.

The truck frame is rectangular in shape, and it has the two side members 1 and 2 which are connected by the end members 3 and 4 forming a rectangular frame. Adjoining the end members are two horizontal members 5 and 6 which are recessed as indicated at 7 and 8 on both sides of the log supporting bolster 9 which extends transversely of the frame.

The members 5 and 6 form a pocket within which the draw bar bumpers 10 and 11 slide. Each of these bumpers has a plate 12 connected thereto to prevent it from passing out of the pocket and said plates bear upon springs 13, one for each "bumper", which springs also bear upon the plates 14 on opposite sides of the bolster 9. Connected to the top of the rear of each draw bar bumper is a bar 15, which extends over the top of the springs to prevent the springs from being dislodged from their receiving pockets.

The members 5 and 6 are slotted so that a bar 17 passing through the bumper may be connected to a notched plate 18 to be slidable with the bumper, the notched plate 18 having a projection at 19, above the side of the member 6 to cause it to engage a wedge-shaped bar 20. This wedge-shaped bar is held in place by means of a cleat 21 on the top of the side rail 2 and suitable pins may be placed in holes in said bar to allow it to be inserted a considerable distance, or withdrawn, as may be desired, to take up the wear on the brake shoes. The bar 20 is arranged between the projection 19 and the top of a lever 22, said lever being pivoted at 23 on the member 6 and being also connected to a link 24 extending to a plate 25 adjacent the bumper 10. The bumper 10 has a bar 26 connected thereto, and to a slidable notched plate 27, the same as the plate 18. This plate has a projection 28 which engages the wedge-shaped bar 29, which bar is precisely the same as the wedge-shaped bar 20. This bar is held in place by the cleat 30 and it bears against a projection 31 of the plate 25, said plate being slidable on its supporting pin 32, said bolt or pin passing into the member 6.

The truck has four supporting wheels 33 to 36 inclusive, which wheels are connected in pairs by the axles 37, 38, and said axles are journalled in suitable bearings 39 to 42.

The brake beams are placed between the truck wheels, 33—35 and 34—36, and are indicated at 46, 47. Each beam is supported by two pairs of links 48, 49 and they have the usual brake shoes 50 for each wheel.

Depending from and supported by the center members 5 and 6 is a fixed bearing 51, said bearing supporting one end of a depending link 52. This link is connected by a pin 53 with a pair of ears 54 on the brake beam 46, and the lower end of this lever 52 is connected by a link 55, with a link 56, which link is connected to the brake beam 47 by a pair of ears 57, and at its upper end the link 56 is connected by means of a link 58 to a depending lug 59 on the horizontally movable lever 60, said lever being in turn connected to the lever 22 and to the link 24.

Pawls 63, 64 engage the notches of the plates 18 and 27 and thereby hold the brakes engaged to any desired extent, but when the brakes are to be released, the workman will go along with a bar disengaging these pawls so that the train can be started.

In order that the brakes may be set by hand, whenever necessary, there is a shaft 65 with a hand-wheel 66 and which shaft carries a pawl-wheel 67 engaged by the pawl 68 to hold the brakes set.

The operation of the apparatus is as follows:

Assuming that the train is to be backed up to the woods from the mill, the bars 20, 29 will be removed far enough to prevent the plates 18, 27 from operating the brakes, thereupon the engine can back the entire train up-grade or along the level without difficulty, for the brakes will not be set but a workman may go along on leading brakes and operate one or more hand brakes and prevent the train from running away from the engine, if it happens to be on a downgrade.

The bars 20, 29, are sufficiently loose in their retaining cleats 21 to allow them to swing forward and back with the bumper, without interfering with their operation, as the bumper movement is only about three inches in a full size truck, and these bars are comparatively longer than the showing of the drawing herewith. The bars also have openings in them to hold them engaged or disengaged from the bumper brake operating mechanism, as may be desired, a suitable pin being inserted in said opening to hold them in one position or the other.

When the logs have been loaded, the bars 20, 29 are thrown in the position shown in Fig. 2 and since the movement of the bumper is only about 3 inches, the cleats 20 and 30 having a loose fit over the bars allow for lateral movement of the bars so they will be carried along with the plates 19 and 27 depending on which bumper is being pushed and thereby operate the lever 22 regardless of which bumper of the given truck happens to bear upon the bumper of another truck. In the one instance the lever 22 will be directly operated by the bar 20, in the other instance it will be operated by the link 24 and engagement of the bar 29 by the plate 27. As the weight of the logs of one truck comes upon the bumper of another truck, the pawls 63, 64 will hold the brakes engaged with sufficient force to properly retard the train, the regulation of the pressure of engagement being effected by the position of the bars 20, 29. When the brakes are to be disengaged the pawls 63, 64 are knocked out of engagement with the plates 18, 27, and then the brakes may be applied by hand by the wheel 66, the cable 69 being wound up on the shaft 65, said shaft being revoluble in two journal boxes 70, 71, and the cable being connected to the lever 60.

In the form of the invention shown in Fig. 4, the truck wheels are shown at 80, 81. The truck frame at 82, and one bumper is shown at 83, said bumper having a lug 84 to operate the rack plate 85. The rack plate 85 engages teeth of a wheel 86 on the shaft 87 carrying the hand wheel 88.

A pawl 89 is placed on the frame so it will engage the teeth of the gear 86, and hold the brake engaged when that is desired. The shaft 87 has the cable 90 secured thereto so it will wind up the cable when pressure is placed on the bumper 83, and as it is connected at the opposite end to a lever 91 the brakes will be operated thereby.

The brake beams are shown at 92, 93 and they are supported by the links 94, 95 in pairs, there being a brake shoe 96 for each wheel. Each brake beam has a lug 97 to pivotally connect it to the levers 91, 98, said levers being pivotally connected together at their lower ends by the link 99. The link 98 is supported by the bearing 100. The gear 86 may be moved out of engagement with the rack 85 at will by sliding it on the shaft 87.

The braking mechanism may be operated either by the bumper or by hand as may be desired.

In the form of the invention shown in Fig. 5, the truck wheels are shown at 110, 111, the truck frame at 112, and the bumper at 113. The bumper is connected by a lug 114 with a plate 115 which is provided with a pin 116, to engage any one of several eyes 117, 118, 119 of a cable 120.

This cable is connected to an eyebolt 121 on the truck frame and passes around a pulley 122, and then to the top of lever 123.

The brake beams are shown at 124, 125, and there is a brake shoe 126 for each wheel, the beams being supported by two pairs of links 127, 128.

The brake beams 124, 125 are connected to the links 127, 128, the former being supported by a bearing 130. In order to operate this brake by hand the link 123 also has a cable 131 connected thereto which cable passes around the shaft 133 carrying the hand wheel 134. The shaft 133 is carried in a horizontal position by suitable bearings under one end of the truck frame.

What I claim is as follows, but modifications may be made in carrying out the invention shown in the drawings and in the above particularly described form thereof, within the purview of the invention as defined by the annexed claims.

1. A logging truck comprising a frame, axles mounted in said frame, wheels on said axles, brake beams mounted on said frame, shoes on said beams, a bumper in each end of said frame acting inwardly against springs, means for holding said bumpers when pushed inwardly, means spaced from said bumpers for setting said brakes, adjustable bars with their ends wedge shaped adapted to bridge the space between said brake setting means and said bumpers whereby the inward movement of said bumpers will set the brakes when said bar is in said space, and means to set said brakes by hand when said bar is removed.

2. A logging truck in combination, comprising a truck frame having a longitudinally movable bumper in each end of said truck frame, springs acting to hold said bumpers against inward movement, truck wheels on said frame, brakes on said wheels, notched plates on said bumpers, pawls pivoted on said frame and acting in said notches to allow inward movement of said bumpers but to hold against outward movement thereof, a lever pivoted on said frame, one end of said lever being spaced from said notched plate, the other end of said lever being connected to said brakes by means of a system of levers, links, and brake beams, and a removable wedge shaped bar, adapted to fill the space adjustably between said notched plate and said lever whereby the inward movement of said bumpers will set said brakes when said wedge bar is in said space.

In testimony whereof I have hereunto set my hand this 26th day of June, A. D. 1924.

STEVE W. OBERTO.